Sept. 4, 1956 W. A. R. BRADLEY 2,761,690
POWER DRIVEN BOAT TRAILER
Filed Jan. 16, 1953 2 Sheets-Sheet 1
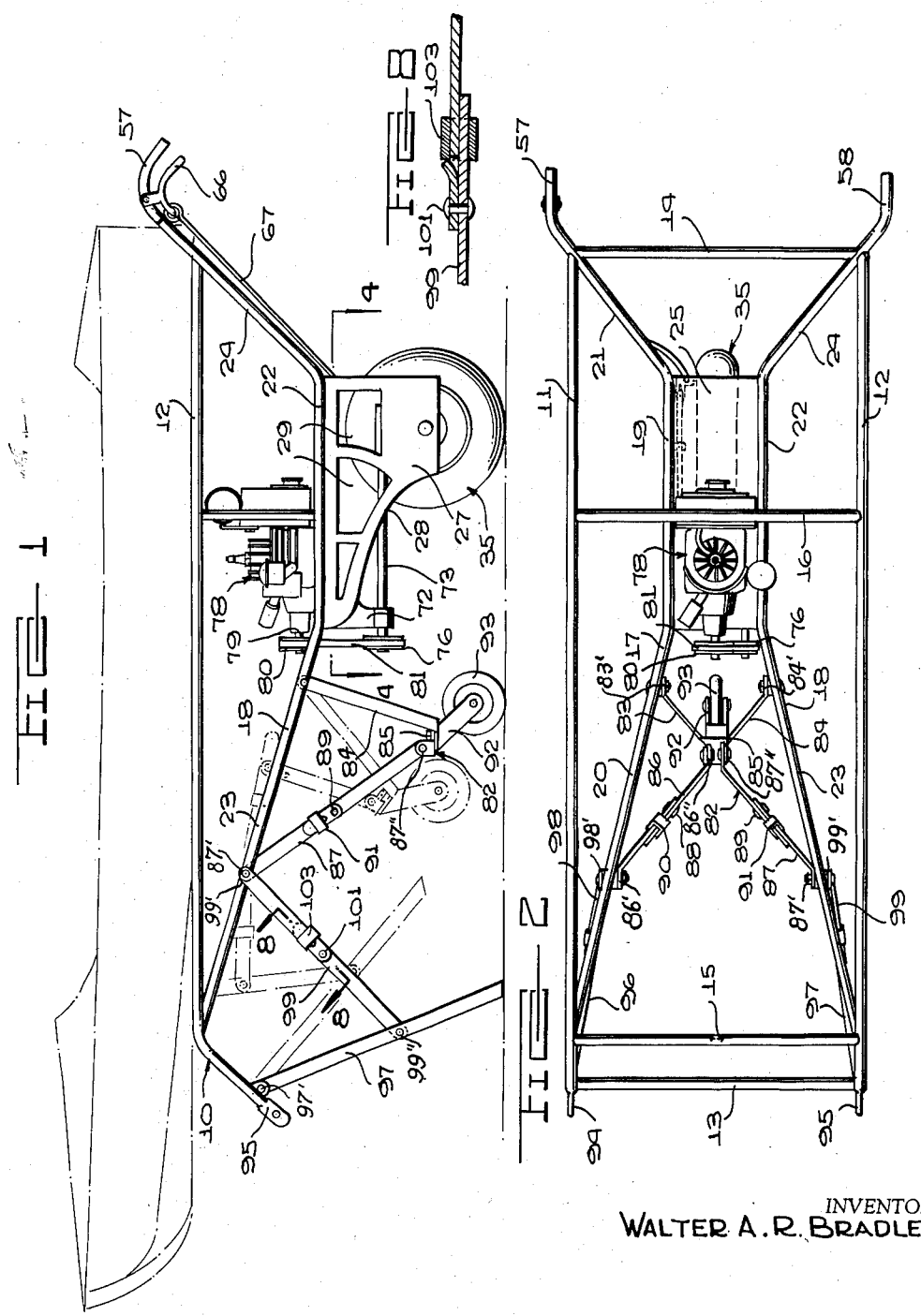
INVENTOR
WALTER A. R. BRADLEY
BY
McMorrow, Berman + Davidson
ATTORNEYS Sept. 4, 1956 W. A. R. BRADLEY 2,761,690
POWER DRIVEN BOAT TRAILER
Filed Jan. 16, 1953 2 Sheets-Sheet 2
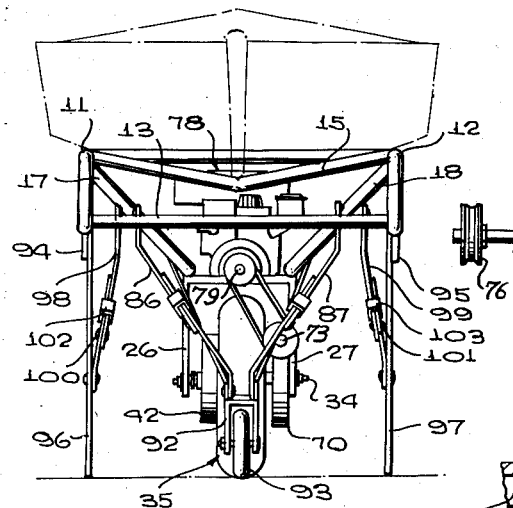
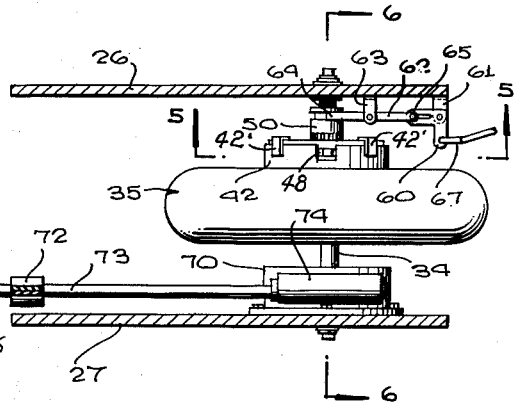
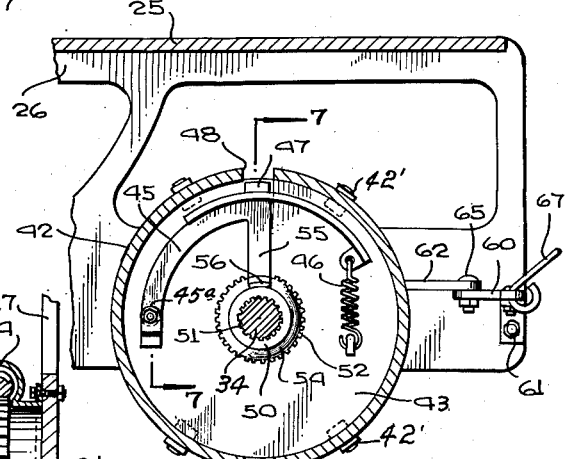
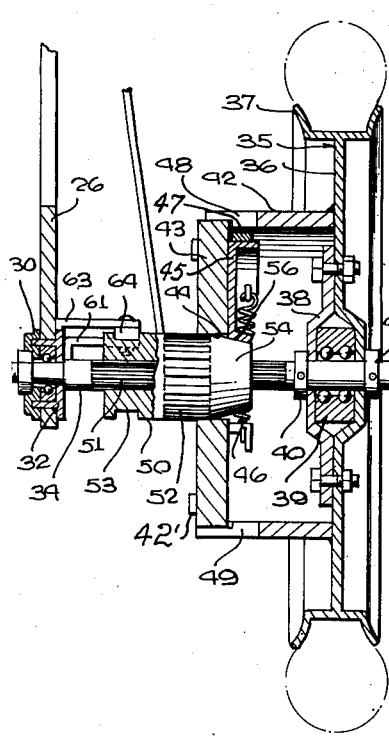
INVENTOR
WALTER A.R. BRADLEY
BY
McMorrow, Berman + Davidson
ATTORNEYS United States Patent Office 2,761,690
Patented Sept. 4, 1956

2,761,690

POWER DRIVEN BOAT TRAILER

Walter A. R. Bradley, John Day, Oreg.

Application January 16, 1953, Serial No. 331,600

1 Claim. (Cl. 280—47.3)

This invention relates to vehicles for carrying large objects, such as boats, camping equipment boxes and large game animals, and more particularly to a vehicle of the character indicated which may be connected to and pulled by a towing vehicle, such as an automobile, and, when separated from a towing vehicle, may be self-propelled under manual control.

It is among the objects of the invention to provide an improved wheeled vehicle for carrying large and heavy objects and which can be connected to a towing vehicle, such as an automobile, and used as a trailer, when desired; which has its own power plant and can be used as a self-propelled vehicle separate from any towing vehicle; which, when self-propelled, can be easily steered and controlled by a walking operator and can navigate rough trails and even trailless territory where automobiles cannot travel; which has sufficient strength to carry heavy loads and sufficient power to carry such loads up steep grades and over obstructions; and which is of simple, durable and light weight construction, economical to manufacture, easy to use, and effective and efficient in use.

Other objects and advantages will become apparent from a consideration of the following description and the appended claim in conjunction with the accompanying drawings wherein:

Figure 1 is a side elevational view of a vehicle illustrative of the invention with a boat mounted thereon;

Figure 2 is a top plan view of the vehicle illustrated in Figure 1;

Figure 3 is a front elevational view of the vehicle with the boat mounted thereon;

Figure 4 is a fragmentary cross sectional view on an enlarged scale on the line 4—4 of Figure 1;

Figure 5 is a fragmentary cross sectional view on a further enlarged scale on the line 5—5 of Figure 4;

Figure 6 is a cross sectional view on a further enlarged scale on the line 6—6 of Figure 4;

Figure 7 is a fragmentary cross sectional view on the line 7—7 of Figure 5; and

Figure 8 is a fragmentary cross sectional view on an enlarged scale on the line 8—8 of Figure 1.

With continued reference to the drawings, the illustrated vehicle comprises an elongated frame, generally indicated at 10, preferably formed of metal tubing of suitable size and strength and including a pair of top side rails 11 and 12 disposed in spaced apart and substantially parallel relationship to each other, front and rear end cross members 13 and 14 extend between the side rails 11 and 12 at the corresponding ends of the frame and are secured at their ends to the side rails, intermediate cross members 15 and 16 are spaced apart between the end cross members 13 and 14 and runner shaped truss members 17 and 18 extend downwardly from the top side rails 11 and 12 in convergent relationship to each other.

The truss members 17 and 18 are preferably elongated tubular members bent at locations spaced apart longitudinally thereof to provide an intermediate portion 19 and 22 on the members 17 and 18 respectively, and end portions 20 and 21, and 23 and 24, inclined relative to the intermediate portions 19 and 20, respectively. The member 17 is secured at one end to the side rail 11 substantially at the location at which the corresponding end of the cross bar 15 is secured to the rail 11 and is secured to the rail 11 at the juncture of the end of this rail and the rear cross bar 14. The truss member 18 is similarly connected at one end to the rail 12 at a location adjacent the corresponding end of the cross member 15 and near its other end to the rail 12 at the juncture of the rail 12 with the cross bar 14. The intermediate portion 19 of the truss member 17 is disposed below and substantially parallel to the top side rail 11 and the inclined end portions 20 and 21 of this member 17 extend from the corresponding ends of the intermediate portion 19 upwardly and outwardly to the rail 11 near the correspondingly opposite ends of this rail. The intermediate portion of the truss member 18 is disposed below and substantially parallel to the top side rail 12 and the end portions 23 and 24 of the member 18 extend upwardly and outwardly from the corresponding ends of the intermediate portion 22 to the side rail 12 near the respectively opposite ends of this side rail.

The intermediate portions 19 and 22 of the truss members 17 and 18 are substantially parallel to each other and spaced apart a distance materially less than the distance between the top side rails 11 and 12.

A platform 25 in the form of a metal plate of elongated, rectangular shape is secured along its opposite side edges to the intermediate portions 19 and 22 of the truss members 17 and 18 respectively and is disposed in a plane spaced downwardly from and substantially parallel to the top side rails 11 and 12 of the frame.

A wheel suspension structure is disposed below the platform 25 and includes side plates 26 and 27 secured along their upper edges to the platform plate 25 one along each side edge of the platform plate and depending perpendicularly from the platform plate in spaced apart and substantially parallel relationship to each other. These side plates are cut away and provided with openings, as indicated at 28 and 29 for the side plate 27, to decrease the weight of the structure.

The side plates 26 and 27 are provided near their lower edges and their rear ends with apertures 30 and 31 respectively which are in alignment with each other transversely of the wheel mounting structure and anti friction ball bearings 32 and 33 are mounted in the plate apertures 30 and 31 respectively.

An axle 34 is journalled at its opposite ends in the ball bearings 32 and 33 and extends transversely across the space between the side plates 26 and 27 and a rubber tired wheel, generally indicated at 35, is mounted on the axle 34 between the side plates 26 and 27. The wheel 35 has a disc-shaped web 36 surrounded by a tire rim 37 and provided at its center with an apertured hub formation 38 in which is mounted an anti friction ball bearing 39 which surrounds the axle 34 and journals the wheel on the axle. The wheel is maintained in position longitudinally of the axle by collars 40 and 41 secured on the axle at the respectively opposite sides of the hub formation 38. A cylindrical drum 42 is secured at one end to the wheel web 36 and extends perpendicularly from one side of the wheel web coaxially of the axle 34 and a clutch plate 43 in the form of a circular disc is disposed within the outer end of the drum 42 and is maintained in such outer end by means of angle brackets 42′ carried by the drum, the disc being provided with a central aperture 44 through which the axle 34 extends and which is materially larger in diameter than the axle.

A clutch shoe 45 of arcuate shape is disposed at the inner side of the clutch plate 43 and pivotally mounted as at 45a at one end of the clutch plate. This shoe 45 extends partly around the interior of the drum 42 in circumferentially spaced relationship relative to the drum and has its other end connected to the clutch plate 43 by a tension spring 46. A clutch dog or detent 47 is mounted on the outer side of the clutch shoe 45 intermediate the length of the shoe and the drum 42 is provided in its end remote from the wheel disc 36 with spaced apart notches 48 and 49 in which the detent 47 is received when the clutch is engaged. A clutch control collar 50 is slidably mounted on the axle 34 and extends through the central aperture 44 in the clutch plate 43. This collar has a longitudinally grooved bore which receives a splined portion 51 of the axle and has a longitudinally splined external portion 52 which is slidably received in the grooved aperture 44 in the plate 43 so that a driving connection is provided from the axle 34 through the collar 52 to the clutch plate 43 constraining the clutch plate to rotate at all times with the axle. Near its end disposed outwardly of the clutch plate 43 the collar 50 is provided with an annular groove 53 and at its end disposed inwardly of the clutch plate is provided with a conically bevelled end portion 54. The clutch shoe 45 is provided with a radially disposed leg 55 terminating in a foot 56 which bears on the outer surface of the collar 50.

With this arrangement, when the collar 50 is forced inwardly of the clutch plate 43 the foot 56 rides up on the conically bevelled end portion 54 of the collar and moves the clutch shoe 45 outwardly away from the collar engaging the clutch detent 47 in one of the notches 48 or 49 in the outer end of the drum 42. This completes a driving connection from the axle 34 through the drum 42 to the drive wheel 35.

The inclined end portions 21 and 24 of the strut members 17 and 18 are extended rearwardly and curved upwardly to the rear of the rear cross bar 14 to provide hand grips 57 and 58 by means of which a person walking behind the vehicle can steer the vehicle and maintain it in level position. A bell crank lever 60 is pivotally mounted intermediate its length on a lug 61 projecting inwardly from the side plate 26 at the rear end of this side plate and a clutch lever 62 is pivotally mounted intermediate its length on a lug 63 which projects inwardly from the side plate 26 at a location spaced forwardly along the side plate from the lug 61. The front end 64 of the lever 62 is engaged in the groove 53 in the collar 50 and at its rear end is pivotally connected to the bell crank lever 60 near one end of this bell crank lever, as indicated at 65. A hand lever 66 is pivotally mounted intermediate its length on the hand grip 57 and a link 67 connects one end of the hand lever 66 to the other end of the bell crank lever 60 so that the clutch can be engaged by finger pressure on the clutch hand lever 66. When finger pressure on the hand lever 66 is released, the clutch is disengaged by the spring 46 which moves the clutch shoe 45 inwardly of the outer edge of the clutch plate 43 and at the same time forces the collar 50 outwardly of the clutch plate.

An annular gear housing 70 is mounted on the inner side of the side plate 27 coaxially of the axle 34 and a worm gear 71 is mounted on the axle 34 and disposed in the gear housing 70. A bearing bracket 72 depends from the platform plate 25 near the front end of the side plate 27 and a shaft 73 is journalled in and extends through the bearing carried by the bracket 72. The shaft 73 is disposed below and substantially parallel to the intermediate portion 22 of the truss member 18 and is journalled at its rear end in a worm housing 74 provided on the gear housing 70. A worm 75 is formed or secured on the shaft 73 near the rear end of the shaft and meshes with the worm wheel 71 and a belt pulley 76 is secured on the shaft near the front end of the shaft and in front of the bearing bracket 72.

A power plant, generally indicated at 78, in the form of a small internal combustion engine, is mounted on the platform plate 25 and has a drive shaft 79 extending forwardly of the platform and carrying a belt pulley 80 which is drivingly connected to the belt pulley 76 on the shaft 73 by a belt 81.

While this arrangement, whenever the engine 78 is running the axle 34 will be driven at a speed much lower than the rotational speed of the engine drive shaft 79 and, when the clutch detent 47 is engaged in one of the notches 48 or 49 in the drum 42, as explained above, the drive wheel 35 will be driven at a slow rate of speed, compared to the rotational speed of the engine drive shaft, to propel the vehicle in a forward direction.

A strut assembly, generally indicated at 82 is pivotally mounted on and depends from the inclined end portions 20 and 23 of the truss members 17 and 18 between the wheel mounting structure and the front ends of the truss members. This strut assembly comprises struts 83 and 84 pivotally connected as at 83' and 84' at their upper ends to the members 17 and 18 respectively near the front end of the platform plate 25 and joined at their lower ends to a base 85. Toggle units which comprise levers 86 and 87 are pivotally connected as at 86' and 87' at their upper ends to the members 17 and 18 at locations spaced forwardly from the upper ends of the struts 83 and 84 and are pivotally connected as at 86" and 87" at their lower ends to the base 85. The toggle unit levers 86 and 87 are provided intermediate their length with knee joints, as indicated at 88 and 89 and with locking sleeves 90 and 91 respectively which are effective to hold the toggle levers rigidly in a straight aligned condition or to release them for bending at their corresponding knee joints. A caster wheel fork 92 is pivotally connected at its upper end to the base 85 and a caster wheel 93 is journalled in the fork 92.

The caster wheel 93 is disposed medially of the width of the frame 10 and spaced forwardly from the drive wheel 35 to provide longitudinal stability for the vehicle whenever the vehicle is self propelled by the engine 78 and drive wheel 35.

The front end portions of the side rails 11 and 12 are bent downwardly and provided at their ends with apertured lug formations 94 and 95 respectively for connection to a rear portion of a trailing vehicle, such as the rear bumper of an automobile when it is desired to tow the vehicle as a trailer by a towing vehicle. When the front end of the boat trailer vehicle is secured to a towing vehicle in the manner indicated above, the sleeves 90 and 91 are moved to positions releasing the knee joints of the toggle units 86 and 87 so that these units can be buckled and the caster wheel 93 moved out of engagement with the ground, as illustrated in broken lines in Figure 1.

Supporting legs 96 and 97 are pivotally connected as at 97' at their upper ends to the top side rails 11 and 12 respectively near the front ends of these side rails and depend from the side rails so that their lower ends may be brought into engagement with the ground to support the vehicle in upright position when it is detached from a towing vehicle and the hand grips 57 and 58 are released by the person guiding the vehicle. Toggle units, each comprising levers 98 and 99 are pivotally connected as at 98' and 99' at their upper ends to the members 17 and 18 respectively substantially at the same locations at which the toggle structures 86 and 87 are connected at their upper ends to these members and are pivotally connected as at 99" at their lower ends to the legs 96 and 97 respectively intermediate the length of these legs. The toggle levers 98 and 99 are connected by knee joints 100 and 101 respectively and locking sleeves 102 and 103 are slidably mounted on the toggle levers 98 and 99 respectively and are effective to hold these toggle levers in a straight aligned condition or to release the knee joints of the structures for bending. When the toggle levers 98 and 99 are held in their straight condition, as illustrated in full lines in Figure 1, the legs 96 and 97 are held in their ground engaging position and, when the locking sleeves 102 and 103 are removed to their releasing position and the knee joints of the toggle structures are bent, the legs may be elevated to a position at which they are clear of the ground, as illustrated in broken lines in Figure 1, either for towing of the trailer vehicle by a towing vehicle or for self propulsion of the trailer vehicle by its own power plant.

The cross members 14, 15 and 16 are preferably bent downwardly to a shallow, V-shape, as illustrated in Figure 3, to accommodate the shape of a boat bottom so that a boat will ride firmly on the top of the frame. When the boat carrying vehicle is to be self propelled, the boat will be mounted on the vehicle, as illustrated in Figure 1, with the stern of the boat disposed somewhat forwardly of the hand grips 57 and 58 and the bow of the boat overhanging the front end of the frame. When the vehicle is to be towed by an automobile, the position of the boat is reversed so that the stern of the boat is disposed somewhat rearwardly of the trailer hitch lugs 94 and 95 on the front end of the frame and the bow of the boat overhangs the rear end of the trailer frame.

While the vehicle is particularly designed to carry a boat either along a roadway behind a towing vehicle or by its own propulsion along rough trails or other places where an automobile cannot travel, it may be used to carry other loads, such as heavy camping equipment, food supplies to isolated posts, heavy game animals or, if provided with a suitable body, loads of material such as earth or gravel.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

In a boat trailer, an elongated frame having a top boat-supporting portion and an intermediate portion spaced below said top portion, said intermediate portion having a rear portion paralleling said upper portion and a forward inclined portion leading upwardly from said rear portion to said upper portion, said frame having a rear end and a forward end, handle means on the rear end of the frame, a declining portion on the forward end of the frame, a fixed wheel suspension on and depending from said rear portion of said intermediate portion, a single ground-engaging wheel on said suspension, ground engaging legs pivoted to and normally depending from opposite sides of said declining portion of the frame and toggle levers pivoted at one end thereof to intermediate points of the legs and pivoted at their other ends to intermediate points of said inclined forward portions of the intermediate portion of the frame.

References Cited in the file of this patent

UNITED STATES PATENTS

| | | |
|---|---|---|
| 202,868 | Rice et al. | Apr. 23, 1878 |
| 704,426 | Allen | July 8, 1902 |
| 820,274 | Watley | May 8, 1906 |
| 1,270,180 | McCune | June 18, 1918 |
| 1,412,234 | Fall | Apr. 11, 1922 |
| 1,437,667 | McCarthy | Dec. 5, 1922 |
| 1,869,746 | Hoke | Aug. 2, 1932 |
| 1,975,417 | Dufour | Oct. 2, 1934 |
| 2,113,448 | Hewitt | Apr. 5, 1938 |
| 2,416,492 | Neeley | Feb. 25, 1947 |
| 2,535,614 | Van Ausdall | Dec. 26, 1950 |
| 2,564,996 | Rasbach | Aug. 21, 1951 |
| 2,567,423 | Cleghorn | Sept. 11, 1951 |
| 2,572,109 | Coates | Oct. 23, 1951 |
| 2,597,107 | Kelsey | May 20, 1952 |
| 2,597,436 | Bobard | May 20, 1952 |

FOREIGN PATENTS

| | | |
|---|---|---|
| 580,222 | Great Britain | Aug. 30, 1946 |